US008886528B2

(12) United States Patent
Tanaka

(10) Patent No.: US 8,886,528 B2
(45) Date of Patent: Nov. 11, 2014

(54) AUDIO SIGNAL PROCESSING DEVICE AND METHOD

(75) Inventor: Naoya Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 340 days.

(21) Appl. No.: 13/375,815

(22) PCT Filed: Jun. 2, 2010

(86) PCT No.: PCT/JP2010/003676

§ 371 (c)(1),
(2), (4) Date: Dec. 2, 2011

(87) PCT Pub. No.: WO2010/140355

PCT Pub. Date: Dec. 9, 2010

(65) Prior Publication Data

US 2012/0089393 A1 Apr. 12, 2012

(30) Foreign Application Priority Data

Jun. 4, 2009 (JP) ................................ 2009-135598

(51) Int. Cl.

| | |
|---|---|
| ***G10L 21/00*** | (2013.01) |
| ***G10L 15/00*** | (2013.01) |
| ***G10L 15/20*** | (2006.01) |
| ***G10L 25/87*** | (2013.01) |
| *G10L 25/12* | (2013.01) |
| *G10L 25/78* | (2013.01) |

(52) U.S. Cl.

CPC ................ *G10L 25/87* (2013.01); *G10L 25/12* (2013.01); *G10L 2025/783* (2013.01)

USPC ........................... 704/231; 704/208; 704/233

(58) Field of Classification Search

CPC .... G10L 25/51; G10L 25/93; G10L 2025/783

USPC ........................................................ 704/231

See application file for complete search history.

(56) References Cited

U.S. PATENT DOCUMENTS

| | | | |
|---|---|---|---|
| 5,121,428 | A | 6/1992 | Uchiyama et al. |
| 5,732,392 | A | 3/1998 | Mizuno et al. |

(Continued)

FOREIGN PATENT DOCUMENTS

| | | |
|---|---|---|
| JP | 1-279300 | 11/1989 |
| JP | 9-90974 | 4/1997 |

(Continued)

OTHER PUBLICATIONS

International Search Report issued Sep. 7, 2010 in corresponding International Application No. PCT/JP2010/003676.

*Primary Examiner* — Douglas Godbold
*Assistant Examiner* — Michael Ortiz Sanchez
(74) *Attorney, Agent, or Firm* — Wenderoth, Lind & Ponack, L.L.P.

(57) ABSTRACT

A highlight section including an exciting scene is appropriately extracted with smaller amount of processing. A reflection coefficient calculating unit (12) calculates a parameter (reflection coefficient) representing a slope of spectrum distribution of the input audio signal for each frame. A reflection coefficient comparison unit (13) calculates an amount of change in the reflection coefficients between adjacent frames, and compares the calculation result with a predetermined threshold. An audio signal classifying unit (14) classifies the input audio signal into a background noise section and a speech section based on the comparison result. A background noise level calculating unit (15) calculates a level of a background noise in the background noise section based on signal energy in the background noise section. An event detecting unit (16) detects an event occurring point from a sharp increase in the background noise level. A highlight section determining unit (17) determines a starting point and an end point of the highlight section, based on a relationship between the classification result of the background noise section and the speech section before and after the event occurring point.

7 Claims, 5 Drawing Sheets

(56) References Cited

U.S. PATENT DOCUMENTS

| | | | | |
|---|---|---|---|---|
| 5,774,849 | A | 6/1998 | Benyassine et al. | |
| 6,691,087 | B2 * | 2/2004 | Parra et al. | 704/240 |
| 6,973,256 | B1 * | 12/2005 | Dagtas | 386/241 |
| 7,266,287 | B2 * | 9/2007 | Zhang | 386/285 |
| 7,283,954 | B2 * | 10/2007 | Crockett et al. | 704/216 |
| 7,386,217 | B2 * | 6/2008 | Zhang | 386/248 |
| 7,558,809 | B2 * | 7/2009 | Radhakrishnan et al. | 1/1 |
| 7,627,475 | B2 * | 12/2009 | Petrushin | 704/270 |
| 7,916,171 | B2 * | 3/2011 | Sugano et al. | 348/157 |
| 8,264,616 | B2 * | 9/2012 | Sugano et al. | 348/700 |
| 2002/0078438 | A1 | 6/2002 | Ashley | |
| 2002/0184014 | A1 * | 12/2002 | Parra et al. | 704/231 |
| 2003/0091323 | A1 | 5/2003 | Abe et al. | |
| 2003/0112261 | A1 * | 6/2003 | Zhang | 345/716 |
| 2003/0112265 | A1 * | 6/2003 | Zhang | 345/723 |
| 2004/0167767 | A1 | 8/2004 | Xiong et al. | |
| 2004/0172240 | A1 * | 9/2004 | Crockett et al. | 704/205 |
| 2005/0267740 | A1 | 12/2005 | Abe et al. | |
| 2010/0278419 | A1 * | 11/2010 | Suzuki | 382/155 |

FOREIGN PATENT DOCUMENTS

| | | |
|---|---|---|
| JP | 11-3091 | 1/1999 |
| JP | 2960939 | 7/1999 |
| JP | 3363336 | 10/2002 |
| JP | 2003-29772 | 1/2003 |
| JP | 2003-530027 | 10/2003 |
| WO | 01/76230 | 10/2001 |

* cited by examiner

AUDIO SIGNAL PROCESSING DEVICE AND METHOD

TECHNICAL FIELD

The present invention relates to a device which analyzes characteristics of input audio signals to classify types of the input audio signals.

BACKGROUND ART

A function for clipping a specific scene containing a certain feature for viewing from long-time video audio signal is used for devices for recording and viewing TV programs (recorders), for example, and is referred to as "highlight playback" or "digest playback", for example. Conventionally, the technology for clipping a specific scene includes analyzing video signals or audio signals for calculating parameters each representing feature of the signals, and classifying the input video audio signal by performing determination according to a predetermined condition using calculated parameters, thereby clipping a section to be considered as the specific scene. The rule for determining the specific scene differs depending on the content of the target input video audio signal and a function for providing a type of scene to the viewers. For example, if the function is for playing exciting scenes in sport programs as the specific scene, the level of cheer by the audience included in the input audio signals is used for the rule to determine the specific scene. The cheer by the audience has a property of noise in terms of audio signal characteristics, and may be detected as the background noise included in the input audio signal. An example of determination process on the audio signals using the signal level, peak frequency, major voice spectrum width of the sound, and others is disclosed (see Patent Literature 1). With this method, it is possible to use the frequency characteristics and the signal level change in the input audio signal to identify the section including the cheer by the audience. However, there is a problem that it is difficult to obtain stable determination result since the peak frequency is sensitive to the change in the input audio signal, for example.

On the other hand, as a parameter for smoothly and precisely representing the spectrum change in the input audio signal includes a parameter for presenting an approximate shape of the spectrum distribution which is referred to as spectrum envelope. Typical examples of the spectrum envelope include Linear Prediction Coefficients (LPC), Reflection Coefficients (RC), Line Spectral Pairs (LSP), and others. As an example, a method using LSP as a feature parameter, and the amount of change in the current LSP parameter with respect to moving average of the LSP parameters in the past as one of determination parameter has been disclosed (see Patent Literature 2). According to this method, it is possible to determine whether the input audio signal is a background noise section or a speech section stably, using the frequency characteristics of the input audio signal, and can classify the sections.

CITATION LIST

Patent Literature

[Patent Literature 1] Japanese Patent No. 2960939
[Patent Literature 2] Japanese Patent No. 3363336

SUMMARY OF INVENTION

Technical Problem

However, especially in the exciting scenes in the sports programs, the input audio signal has a specific characteristic. FIG. 1 illustrates the relationship between the speech and background noise in an exciting scene, and the characteristics of the audio signals illustrating the highlight section determined based on the conventional method. In FIG. 1, 201 is a speech signal including commentating sound by an announcer, and 202 is a background signal including the cheer by the audience. Although the speech signal and the background noise signal are overlaid, the section may be classified into the speech section 204, the background noise section 203 and the background noise section 205, depending on whether the speech signal or the background signal is dominant. The temporal level change in the speech signal and the background noise signal indicates characteristic change before and after the event occurring in the exciting scene (for example, scoring scene). More specifically, the background noise level gradually increases toward the correct event occurring point 206, and drastically increases around the event occurring point. In addition, from the time before the event occurring point to the event occurring point, the speech signal commentating on the details of the event is overlaid. After the event ends, the background noise level is decreased. Here, a notable characteristic is that the speech signal is dominant in the section around the correct event occurring point 206, and the section is classified as the speech section 204. Accordingly, if a method for detecting a sharp increase in the signal level in the background noise section is used, the connecting point 207 of the speech section 204 and the background noise section 205 which is the starting point of the background noise section 205 becomes the event occurring point, making it difficult to find out the correct event occurring point 206. Furthermore, when viewing the exciting scene, it is preferable that the viewing section (hereafter referred to as "highlight section 208 suitable for viewing) includes the correct event occurring point 206 and the entire speech section 204 in which the comments on the details of the event are made. Therefore, the starting point 209 of the highlight section should be the starting point of the speech section 204. In addition, regarding the end point 210 of the highlight section, it is preferable that this point is located when the cheer by the audience goes down, that is, when the decreasing background noise level is sufficiently decreased. As described above, in order to determine the highlight section, it is necessary to determine an appropriate starting point and end point of the section before and after the detected event occurring point.

In particular, with regard to the position of the starting point of the highlight section, with the first conventional method setting the detected event occurring point as the starting point, the connecting point 207 of the speech section 204 and the background noise section 205 becomes an event occurring point. Thus, the highlight section 211 is determined to have, as the starting point, the connecting point 207 between the speech section 204 and the background noise section 205. The highlight section 211 determined by the first conventional method has many problems since the speech section 204 including the commentating voice before the event is not included. With the second conventional method which sets the starting point 213 of the highlight section temporally before the time offset 212 with respect to the connecting point 207 of the speech section 204 and the background noise section 205, that is, the event occurring point, by providing the time offset 212 with respect to the detected event occurring point, the length of the speech section 204 differs from scene to scene. Thus, the starting point 213 of the highlight section is set within the speech section 204. In this case, there is a problem that the playback of the highlight section 214 determined by the second conventional method starts in the middle of the talk, and the speech may be inaudible.

Furthermore, in order to represent the characteristic of the input audio signal using spectrum envelop for classifying the input audio signals, it is necessary to increase the order of the spectrum envelope parameter, and usually approximately 8-order to 20-order parameter is used. In order to calculate a spectrum envelope parameter with a certain order, it is necessary to calculate an auto-correlation coefficient with the same order. As a result, there is a problem of increased amount of processing.

The present invention has been conceived in order to solve the problem above, and it is an object of the present invention to provide an audio signal processing device capable of classifying the input audio signal as the background noise section or the speech section with smaller amount of processing, and appropriately select a highlight section including exciting scene by using the characteristics of temporal change of the audio signal.

Solution to Problem

In order to solve the problem described above, an audio signal processing device according to an embodiment of the present invention is a device which extracts a highlight section including a scene with a specific feature from an input audio signal by dividing the input audio signal into frames each of which is a predetermined time length and by classifying characteristics of an audio signal for each divided frame, the audio signal processing device includes: a parameter calculating unit which calculates a parameter representing a slope of spectrum distribution of the input audio signal for each frame; a comparison unit which calculates an amount of change in the parameters representing the slope of the spectrum distribution between adjacent frames, and compares the calculation result with a predetermined threshold; a classifying unit which classifies the input audio signal into a background noise section and a speech section based on the comparison result; a level calculating unit which calculates a level of a background noise in the background noise section based on signal energy in a section classified as the background noise section by the classifying unit; an event detecting unit which detects a sharp increase in the calculated background noise level and detects an event occurring point; and a highlight section determining unit which determines a starting point and an end point of the highlight section, based on a relationship between the classification result of the background noise section and the speech section before and after the detected event occurring point.

Furthermore, in an audio signal processing device according to another embodiment of the present invention the parameter representing the slope of the spectrum distribution of the input audio signal may be a first-order reflection coefficient.

In an audio signal processing device according to another embodiment of the present invention the classifying unit may compare the amount of change in parameters representing the slope in the spectrum distribution with the threshold, and determine that the input audio signal is the background noise section when the amount of change is smaller than the threshold, and that the input audio signal is the speech section when the amount of change is larger than the threshold.

In an audio signal processing device according to another embodiment of the present invention the highlight section determining unit is configured to search for a speech section immediately before the event occurring point, tracking back in time from the event occurring point, and to match a starting point of the highlight section with the speech section obtained as the search result.

Note that, the present invention can not only be implemented as a device but also as a method including processing units configuring the device as steps, as a program causing a computer to implement the steps, as a recording medium such as computer-readable CD-ROM in which the program is recorded, as information, data, or signal indicating the program. Furthermore, the program, the information, the data, and the signal may be distributed via the communication network such as the Internet.

Advantageous Effects of Invention

According to the present invention, it is possible to select an appropriate highlight section by using the characteristics in temporal change in the input audio signal in the highlight section.

Furthermore, according to the present invention, it is possible to select an appropriate highlight section with less processing amount by using a first-order reflection coefficient as a parameter for detecting the characteristics in the temporal change in the input audio signal.

DESCRIPTION OF EMBODIMENTS (Embodiment 1)

Figure 1:
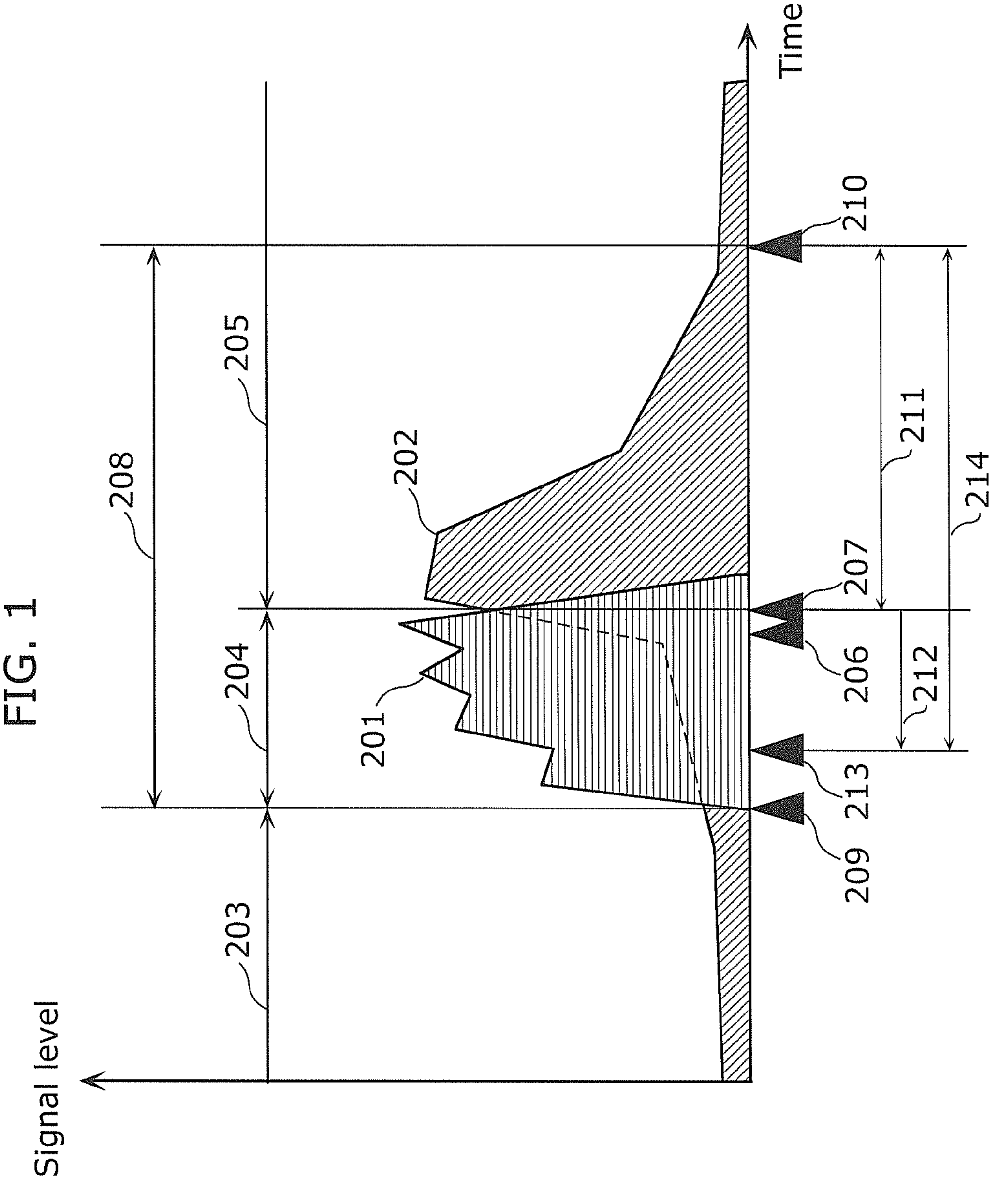
FIG. 1 illustrates the relationship between speech and background noise in exciting scene, and the characteristics of the audio signal indicating the highlight section determined by the conventional method.
Figure 2:
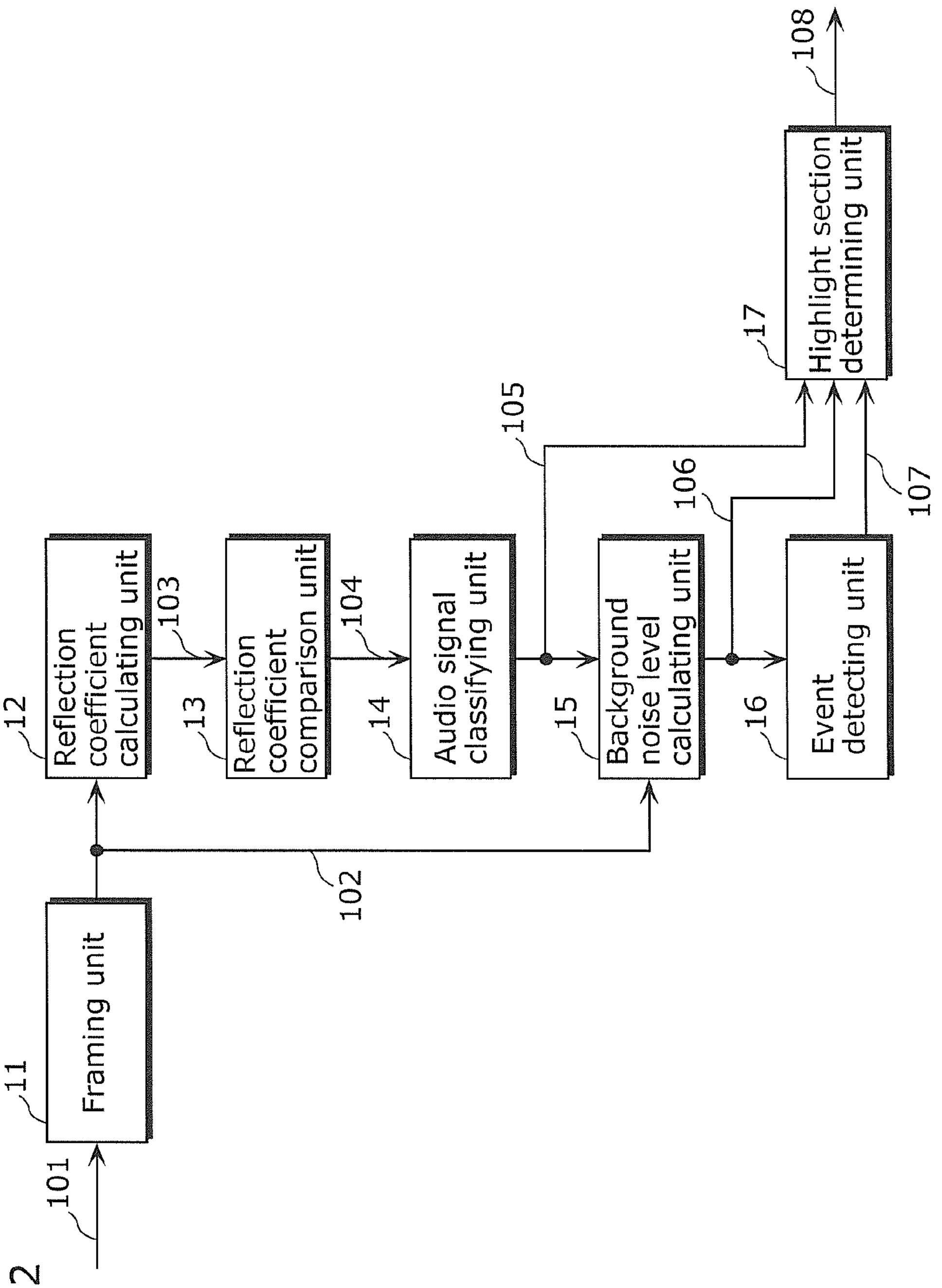
FIG. 2 illustrates the configuration of the audio signal processing device according to the embodiment 1 of the present invention.

FIG. 2 illustrates the configuration of the audio signal processing device according to the embodiment 1. In FIG. 2, the arrows between the processing units indicate the flow of the data, and the reference numerals assigned to the arrows indicates the data passed between the processing units. As illustrated in FIG. 2, the audio signal processing device determining the highlight section with small calculating amount based on the characteristics of the temporal change in the component of the input audio signal in the exciting section includes a framing unit 11, a reflection coefficient calculating unit 12, a reflection coefficient comparison unit 13, an audio signal classifying unit 14, a background noise level calculating unit 15, an event detecting unit 16, and a highlight section determining unit 17. The framing unit 11 divides the input audio signal 101 into a frame signal 102 of a predetermined frame length. The reflection coefficient calculating unit 12 calculates a reflection coefficient for each frame from the frame signal 102 of the predetermined frame length. The reflection coefficient comparison unit 13 compares the reflection coefficients 103 for adjacent frames, and outputs the comparison result 104. The audio signal classifying unit 14 classifies the input audio signal into the speech section and the background section based on the comparison result of the reflection coefficients, and outputs the classification result 105. The background noise level calculating unit 15 calculates the background noise level 106 in the background noise section of the input audio signal based on the classification result 105. The event detecting unit 16 detects the event occurring point 107, based on the change in the background noise level 106. The highlight section determining unit 17 determines the highlight section 108, based on the classification result 105 of the input audio signal, the information on the background noise level 106 and the event occurring point 107, and outputs the determined highlight section 108.

Figure 3:
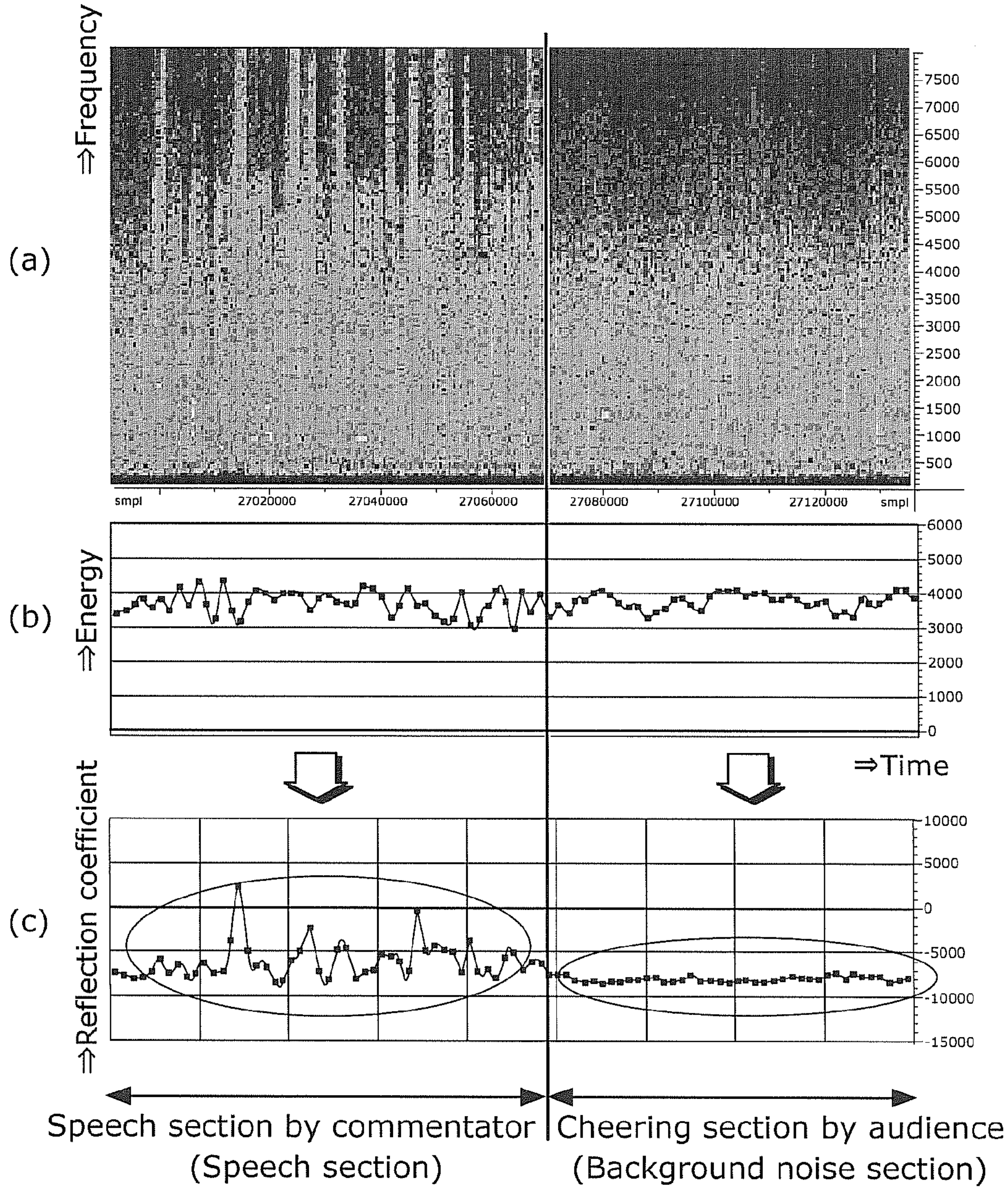
FIG. 3(*a*), FIG. 3(*b*), and FIG. 3(*c*) illustrates the characteristic of spectrum distribution between the speech section and the background noise section in the exciting scene.
Figure 4:
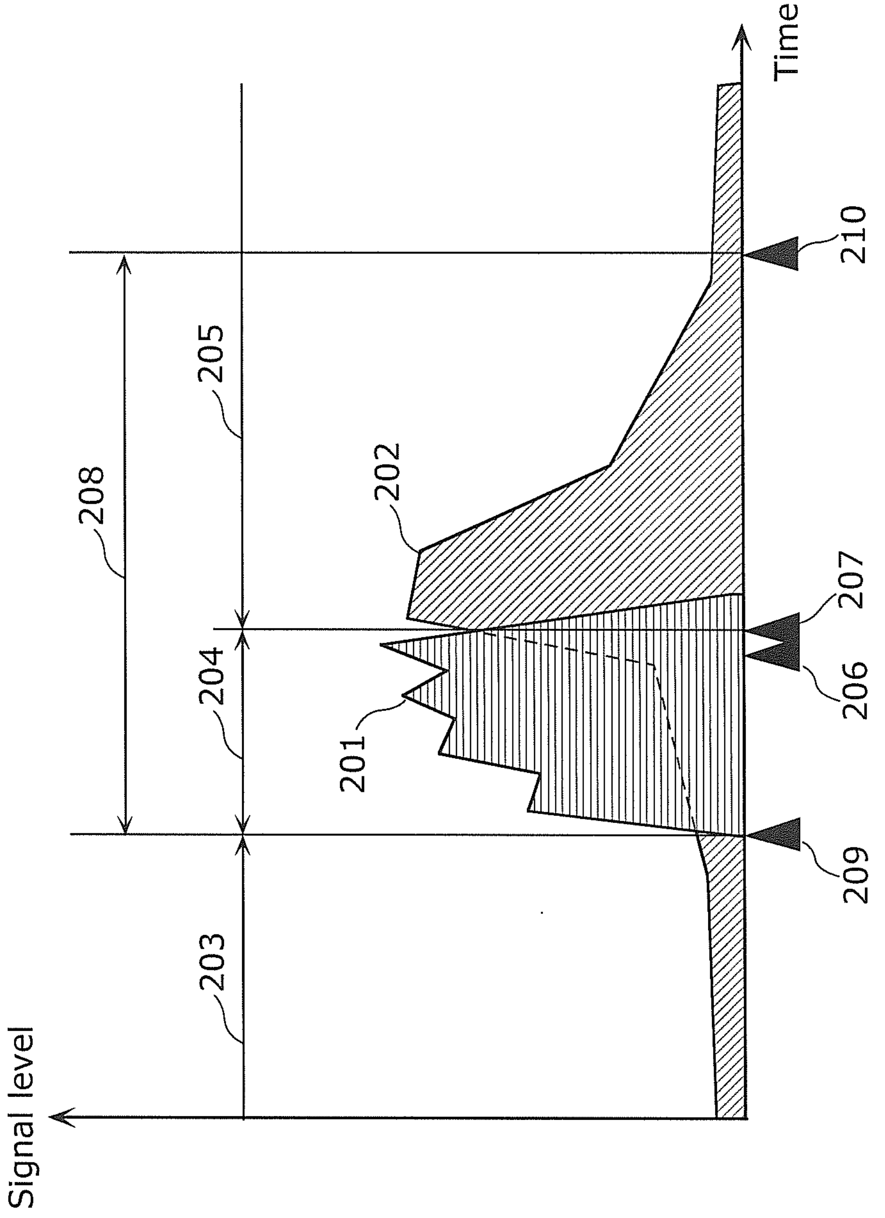
FIG. 4 illustrates the characteristics of the audio signal indicating relationship between the speech and the background noise in the exciting scene and the characteristics of the audio signal indicating the classification result of the speech section and the background noise section according to the present invention.

Here, a relationship between the parameter used by the audio signal processing device according to the present invention and the characteristics of the input audio signal in the exciting scenes in the sport program shall be described. FIG. 3 (*a*) to FIG. 3 (*c*) illustrates results of the spectrum analysis of the audio signal from the exciting scene in the sport program. In FIG. 3 (*a*), the horizontal axis indicates time and the time length is 9 seconds. The vertical axis indicates frequency and the frequency range is from 0 to 8 kHz. The higher signal level, the higher the brightness. The highlight section 208 including the exciting scene and suitable for viewing includes a correct event occurring point 206, and includes the speech section 204 and the background noise section 205. The connecting point 207 of the speech section 204 and the background noise section 205 indicating the divided point by the vertical line at the center is a switching point of the dominant component from speech and background noise in the audio signal. FIG. 4 illustrates the characteristics of the audio signal indicating the relationship between the speech and background noise in the exciting scene, and the classification result of the speech section 204 and the background noise section 205 according to the present invention. Accordingly, as illustrated in FIG. 4, by the classification by the audio signal classifying unit 14, at the connecting point 207 of the speech section 204 and the background noise section 205 at which the dominant component of the audio signal switches between the speech and the background noise, the speech section 204 and the background noise section 205 are switched.

More specifically, as illustrated in FIG. 3 (*a*) and FIG. 3 (*b*), in the first half of the speech section, the spectrum distribution of the audio signal significantly change in a relatively small time from a few tens to a few hundreds msecs. This is because the speech signal is composed of three main elements, consonants, vowels, and void, and the switch between these three components occurs in a relatively short time. The following shows the characteristics of the spectrum distribution of these components.

Consonants: components in middle to high range (approximately 3 kHz or higher) are strong Vowels: components in low to middle range (approximately between a few hundreds Hz to 2 kHz) are strong Void: Spectrum characteristics of background noise appear In the present invention, the difference in the spectrum distribution characteristics of consonants and vowels are focused, and the characteristics are used. More specifically, if the spectrum distribution with strong middle-high range component and the spectrum distribution with strong low-middle range components are switched in a relatively short time, it is possible to determine the audio signal as the speech signal. In the spectrum distribution, the slope of the spectrum distribution is sufficient to determine whether the middle-high range component is strong or the low-middle range component is strong. More specifically, it is not necessary to evaluate the spectrum envelope shape by using the high-order spectrum envelope parameter. First-order reflection coefficient is a parameter indicating the slope of the spectrum distribution with smallest amount of processing, and is calculated by the following equation. Note that, although the first-order reflection coefficient is used here, low-order LPC or LSP may be used instead of the reflection coefficient, for example. However, even when LPC or LSP is used, first-order LPC or first-order LSP is more preferable.

[Math 1]

$$k1 = \frac{\sum_{i=1}^{n-1} x(i)x(i-1)}{\sum_{i=0}^{n-1} x(i)x(i)} \qquad \text{(Equation 1)}$$

k1: First-order reflection coefficient x (i): Input audio signal n: The number of frame samples When the first-order reflection coefficient is positive, it indicates that the component on the high spectrum range is strong. On the other hand, when the first-order reflection coefficient is negative, it indicates that the low spectrum range is strong. As illustrated in the first half of FIG. 3 (*c*), when the input audio signal is a speech signal, the value of the first-order reflection coefficient significantly changes within a relatively short time. In the background noise section in the latter half of FIG. 3 (*a*), the change in the temporal spectrum distribution is small. This is because the cheer by the audience which composes the background noise is the average of the overlap of voices of many people. The first-order reflection coefficient is useful to represent the feature of the spectrum distribution. More specifically, the change in the spectrum distribution is small. Thus, the slope in the spectrum distribution is almost constant, and as illustrated in the latter half of FIG. 3 (*c*), the values of the first-order reflection coefficient barely change. By using the characteristics described above, when classifying the input audio signal into the speech section and the background section, it is possible to use only the first-order reflection coefficient representing the slope of the spectrum distribution, without using the high-order spectrum envelope parameter representing the spectrum envelope as in the conventional technology.

Figure 5:
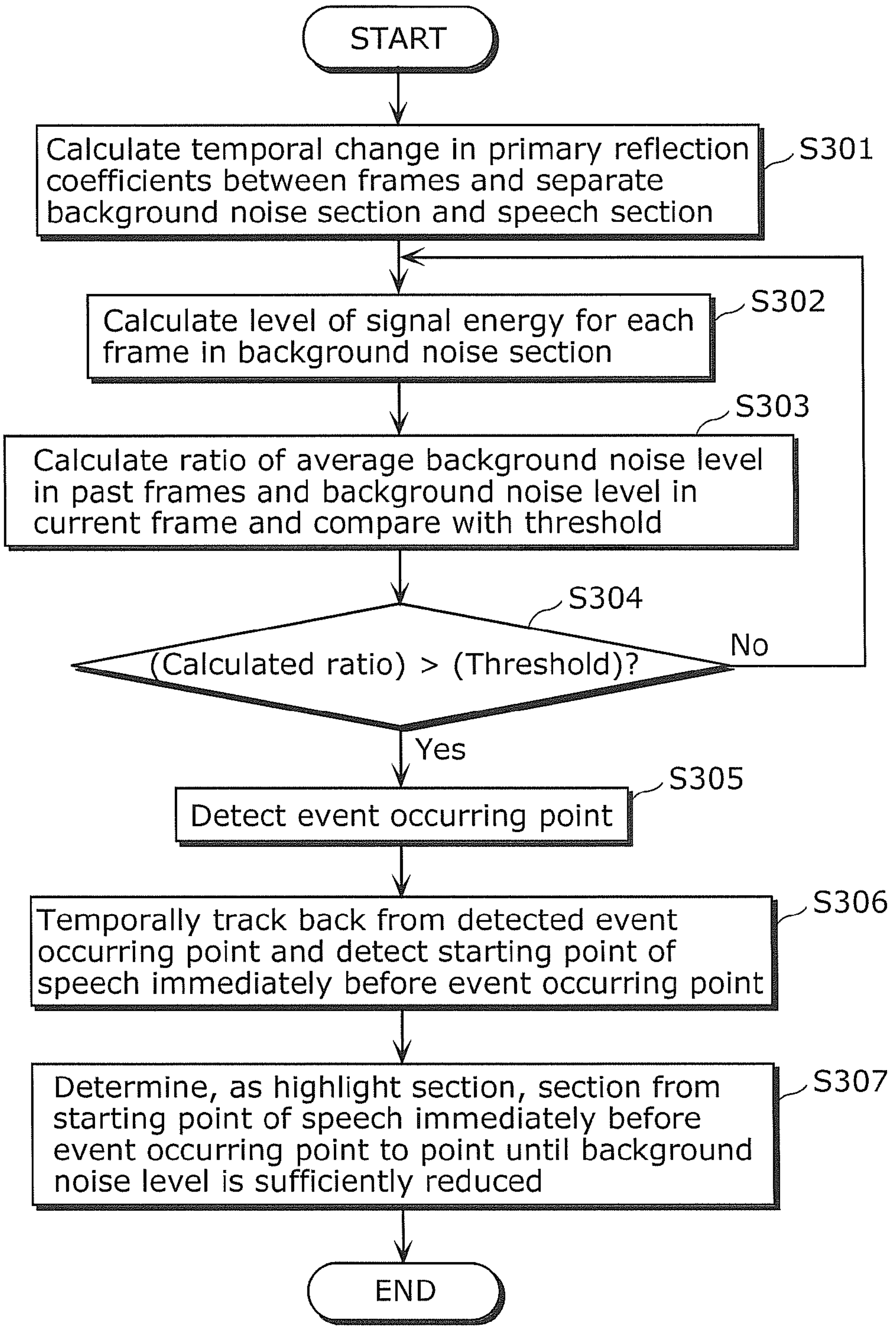
FIG. 5 is a flowchart illustrating the operation of the audio signal processing device in the highlight section determining process.

The operation of the audio signal processing device according to the present invention shall be described based on relationship between the characteristics of the input audio signal and the characteristics of the first-order reflection coefficient described above. FIG. 5 is a flowchart illustrating the operation of the audio signal processing device in the process for determining the highlight section. The input audio signal 101 is divided into a frame signal 102 of a predetermined length by the framing unit 11. It is preferable that the length of the frame is set between approximately 50 msec to 100 msec since it is necessary to capture the change between consonants and vowels in the speech signal. The reflection coefficient calculating unit 12 calculates the first-order reflection coefficient 103 for each frame. The reflection coefficient comparison unit 13 compares the first-order reflection coefficients between adjacent frames, and outputs the amount of the change in the first-order reflection coefficient as the comparison result 104. As the scale for the change in the first-order reflection coefficient, the average difference value given by the following equation (the equation 2) is used. This average difference value is an example of "an amount of change in the parameters representing the slope of the spectrum distribution between adjacent frames". Note that, here, an example using the average difference value represented by equation 2 is illustrated. However, instead of the average difference value, a sum of absolute difference value or square sum of the difference may be used.

[Math 2]

$$ad\_k1 = \frac{1}{Nk}\sum_{m=0}^{Nk-1}|k1(m) - k1(m+1)| \quad \text{(Equation 2)}$$

ad_K1: Average difference value of first-order reflection coefficient

Nk: Number of frames for calculating average k1 (m): First reflection coefficient m frames before current frame The number of frames Nk for calculating the average differs depending on the time length of the frames. For example, when the frame length is 100 msec, Nk=5 to 10 is appropriate. The audio signal classifying unit 14 classifies the input audio signal into the speech section and the background noise section, based on the amount of the change in the first-order reflection coefficients (S301). As described above, in the speech section, the change in the first-order reflection coefficients is large. On the other hand, the change is small in the background noise section. The classification is performed by comparing the average difference value with the predetermined threshold TH_k1 illustrated in the equation 2. TH_k1 =0.05 is an example of the threshold.

ad_k1>TH_k1 then, input audio signal is speech section ad_k1≤TH_k1 then, input audio signal is background noise section [Math 3]

The background noise level calculating unit 15 calculates the signal energy for each frame, based on the classification result 105 and only in the section classified as the background noise section (S302), and determines the background noise level 106. The event detecting unit 16 assesses the change in the background noise level for adjacent frames, and detects the event occurring point 107 (corresponding to the connecting point 207 between the speech section 204 and the background noise section 205) (S303 to S305). As an example of assessment method, a method of comparing the ratio of the average background noise level in past frames and the background noise level of the current frame with the predetermined threshold TH_Eb. TH_Eb=2.818 (=4.5 dB) is an example of the threshold.

[Math 4]

$$r\_Eb = \frac{Eb(0)}{a\_Eb}$$

$$a\_Eb = \frac{1}{Ne}\sum_{m=1}^{Ne}\{Eb(m)\}$$

a_Eb: Average background noise level in past Ne frames

Ne: The number of frames for calculating average

Eb (m): Background noise level m frames before current frame r_Eb>TH_Eb then, current frame is event occurring point r_Eb≤TH_Eb then, current frame is not event occurring point As illustrated in FIG. 2, the highlight section determining unit 17 determines, based on the classification result 105 of the audio signal and the detection result of the event occurring point 107, the highlight section 108 equivalent to the highlight section 208 suitable for viewing, and outputs the highlight section 108. In order to determine the starting point and the end point of the highlight section, the audio signal characteristics in the exciting scene described above is used. First, the speech section 204 is searched in a direction temporally tracking back time from the event occurring point 107. When the speech section 204 is found, the staring point of the speech section is set to be the starting point 209 of the highlight section (S306). Next, the background noise level is assessed in a forward direction in time from the event occurring point, and a point in which the background noise level is sufficiently reduced, for example, a point in time when the background noise level is reduced for 10 dB from the highest value is determined to be the end point 210 of the highlight section (S307). However, when the speech section appears before the background noise level is sufficiently reduced, the highest value of the background noise level is held without detecting the end point, and the end point detection resumes after the end of the speech section, entering the background noise section again. More specifically, the highlight section determining unit 17 determines a point in time when the background noise level is reduced for 10 dB from the highest value of the held background noise level to be the end point 210 of the highlight section 108. As described above, the highlight section is determined by determining the starting point and the end point of the highlight section 108.

As described above, by using the audio signal processing device according to the present invention, it is possible to extract the highlight section 208 suitable for viewing as the highlight section 108 with less processing amount by classifying the input audio signal using the first-order reflection coefficient representing the slope of the spectrum distribution as an assessment index for the spectrum distribution, and using the feature of the temporal change in the signal characteristics in exciting scenes.

Note that, in the description of the embodiment described, above, the parameter calculating unit which calculates the parameter representing the slope of the spectrum distribution of the input audio signal for each frame may calculate the parameter representing the spectrum distribution of the input audio signal by using a part of the input audio signal included in the frame. For example, when the time length of the frame is 100 ms, the parameter representing the slope of the spectrum distribution of the input audio signal is calculated using only the input audio signal of 50 ms which is the center of the time length. With this, it is possible to further reduce the processing amount for calculating the parameter.

Note that, in the description of the embodiment, the description has been made using the exciting scene in sport program as the specific scene. However, the application of the present invention is not limited to this example. For example, in the exciting scene in variety program, drama, theatrical entertainment and others, the video is also composed of the speech section by performers and the background noise section mostly composed of the cheer by the audience. Thus, it is possible to clip the highlight section including the exciting scene by using the configuration of the present invention.

(1) Specifically, the devices described above is a computer system including a microprocessor, ROM, RAM, a hard disk unit, a display unit, a keyboard, a mouse, and others. A computer program is stored in the RAM or the hard disk unit. The microprocessor operates according to the computer program so as to achieve the functions of the devices. Here, the computer program is configured with a combination of command codes for sending instruction to the computer in order to achieve the predetermined function.

(2) A part or all of the constituent elements constituting the respective apparatuses may be configured from a single System-LSI (Large-Scale Integration).
The System-LSI is a super-multi-function LSI manufactured by integrating constituent units on one chip, and is specifically a computer system configured by including a microprocessor, a ROM, a RAM, and so on. A computer program is stored in the RAM. The microprocessor operates according to the computer program so as to achieve the functions of the devices.

(3) A part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and the so on. The IC card or the module may also be included in the aforementioned super-multi-function LSI. The IC card or the module achieves its function through the microprocessor's operation according to the computer program. The IC card or the module may also be implemented to be tamper-resistant.

(4) The present invention may be a method described above. In addition, the present invention may be a computer program for realizing the previously illustrated method, using a computer, and may also be a digital signal including the computer program Furthermore, the present invention may also be realized by storing the computer program or the digital signal in a computer readable recording medium such as flexible disc, a hard disk, a CD-ROM, an MO, a DVD, a DVD-ROM, a DVD-RAM, a BD (Blu-ray Disc), and a semiconductor memory. Furthermore, the present invention also includes the digital signal recorded in these recording media.

Furthermore, the present invention may also be realized by the transmission of the aforementioned computer program or digital signal via a telecommunication line, a wireless or wired communication line, a network represented by the Internet, a data broadcast and so on.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible.

(5) The embodiment and the variations may also be combined.

[Industrial Applicability]

The audio signal processing device according to the present invention can be implemented as an audio-video recorder/player such as DVD/BD recorder, and an audio recorder/player device such as IC recorder. With this, it is possible to implement a function that allows clipping only a certain scene from the recorded video and recorded sound information and viewing the specific scene in a short period of time.

[Reference Signs List]

11 Framing unit
12 Reflection coefficient calculating unit
13 Reflection coefficient comparison unit
14 Audio signal classifying unit
15 Background noise level calculating unit
16 Event detecting unit
17 Highlight section determining unit
101 Audio signal
102 Frame signal
103 Reflection coefficient
104 Comparison result
105 Classification result
106 Background noise level
107 Event occurring point
108, 208 Highlight section suitable for viewing
201 Speech signal
202 Background noise signal
203, 205 Background noise section
204 Speech section
206 Correct event occurring point
207 Connecting point of speech section and background noise section
209, 213 Starting point of highlight section
210 End point of highlight section
211, 214 Highlight section
212 Time offset

The invention claimed is:

1. An audio signal processing device which extracts a highlight section including a scene with a specific feature from an input audio signal by dividing the input audio signal into frames each of which is a predetermined time length and by classifying characteristics of an audio signal for each divided frame, said audio signal processing device comprising:

a parameter calculating unit configured to calculate, for each respective frame of the frames, a single parameter representing a slope of spectrum distribution of the input audio signal in the respective frame, such that a single value representing the slope is calculated for each respective frame;

a comparison unit configured to calculate an amount of change between the parameters representing the slope of the spectrum distribution between adjacent frames, and to compare a result of the calculation performed by the comparison unit with a predetermined threshold;

a classifying unit configured to classify the input audio signal into a background noise section and a speech section based on a result of the comparison performed by the comparison unit;

a level calculating unit configured to calculate a level of a background noise in the background noise section based on signal energy in a section classified as the background noise section by said classifying unit;

an event detecting unit configured to detect a sharp increase in the calculated background noise level and to detect an event occurring point; and a highlight section determining unit configured to determine a starting point and an end point of the highlight section, based on a relationship between a result of the classification of the background noise section and the speech section before and after the detected event occurring point.

2. The audio signal processing device according to claim 1, wherein the parameter representing the slope of the spectrum distribution of the input audio signal, as calculated for each frame, is a first-order reflection coefficient.

3. The audio signal processing device according to claim 1, wherein said classifying unit is configured to compare the amount of change between the parameters representing the slope in the spectrum distribution with the threshold, and to determine that the input audio signal is the background noise section when the amount of change is smaller than the threshold, and that the input audio signal is the speech section when the amount of change is larger than the threshold.

4. The audio signal processing device according to claim 1, wherein said highlight section determining unit is configured to search for a speech section immediately before the event occurring point, tracking back in time from the event occurring point, and to match the starting point of the highlight section with the speech section obtained as a result of the search.

5. An audio signal processing method for extracting a highlight section including a scene with a specific feature from an input audio signal by dividing the input audio signal into frames each of which is a predetermined time length and by classifying characteristics of an audio signal for each divided frame, said audio signal processing method comprising:

calculating, for each respective frame of the frames, a single parameter representing a slope of spectrum distribution of the input audio signal in the respective frame, such that a single value representing the slope is calculated for each respective frame;

calculating an amount of change between the parameters representing the slope of the spectrum distribution between adjacent frames, and comparing a result of the calculation performed by said calculating of the amount of change with a predetermined threshold;

classifying the input audio signal into a background noise section and a speech section based on a result of the comparison performed by said comparing of the result of the calculation;

calculating a level of a background noise in the background noise section based on signal energy in a section classified as the background noise section in said classifying;

detecting a sharp increase in the calculated background noise level and detecting an event occurring point; and determining a starting point and an end point of the highlight section, based on a relationship between a result of the classification of the background noise section and the speech section before and after the detected event occurring point.

6. A non-transitory computer-readable recording medium having a program recorded thereon, the program for causing a computer to execute steps included in the audio signal processing method according to claim 5.

7. An integrated circuit comprising a configuration included in the audio signal processing device according to claim 1.

* * * * *